March 23, 1965   E. J. J. BENARD ET AL   3,174,841
DEVICE FOR MOULDING GLASS ARTICLES
Filed Sept. 12, 1961
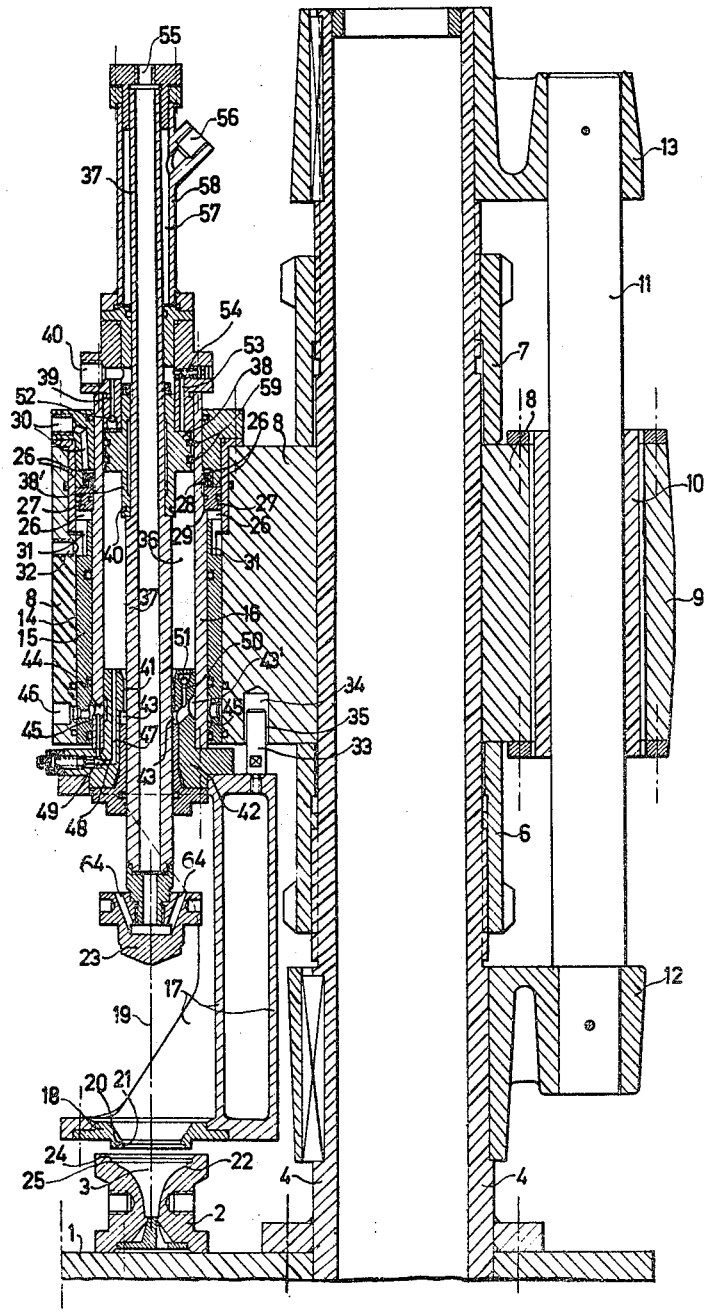
INVENTORS
EMIL J. J. BENARD
GERRIT DE LEEUW
BY
ATTORNEY

United States Patent Office 3,174,841
Patented Mar. 23, 1965

3,174,841
DEVICE FOR MOULDING GLASS ARTICLES
Emil Jan Johan Benard and Gerrit de Leeuw, Leerdam, Netherlands, assignors to N.V. Vereenigde Glasfabrieken (United Glassworks), Schiedam, Netherlands, a limited-liability company of the Netherlands
Filed Sept. 12, 1961, Ser. No. 137,631
Claims priority, application Netherlands, Sept. 12, 1960, 255,804
1 Claim. (Cl. 65—307)

The invention relates to a device for manufacturing glass articles by pressing them from molten glass in a mould upon which a moulding ring is sealingly engaged, with a pressing cone being moved in sealing contact with the inner edge of the moulding ring into the mould. It is known in the art to make use of coupled control means for a pressure medium which drives the moulding ring and the pressing cone.

It is an object of the invention to simplify the operation of a device of the described character and also to increase the accuracy thereof so as to obtain an improved product of high quality and a limitation of waste.

The above and other objects of the invention, the manner wherein and the means whereby they are obtained will follow from the specification given hereinafter with the aid of the drawing, wherein the single figure is a vertical section through a device embodying the invention. A part of a mould table 1 is shown with a mould 2 placed thereon and having a cavity 3 in which the foot of a glass with a stem is to be moulded. The stock of the device, the actuation thereof, the ducts and control devices for the pressure fluid and such parts which are not essential for the understanding of the invention are not represented in the figure.

Through the mould table 1 extends a vertical hollow column 4 and a guide block 8 is secured thereon by means of the nuts 6 and 7. The guide block 8 is further positioned by a protruding part 9 thereof containing a bushing 10 which is slidable on a column or rod 11 fixed in the yokes 12 and 13 secured to the column 4.

The guide block 8 is provided with a bore 14 with a casinglike inner lining 15. Inside of the casing 15 there is inserted a vertically slidable casing 16 which supports a moulding ring 18 by means of an arm 17 extending along the column 4 between the guide block 8 and the mould table 1. The moulding ring 18 is consequently centered for movement along a fixed vertical path corresponding to its axis 19. The moulding ring 18 is depicted in the raised position in which it is directly over the mould 2. A downwardly protruding edge 20 of the moulding ring 18 is provided with an annular mould cavity 21 which is intended to be engaged with the upper edge 22 of the mould cavity 3 in the mould 2 to produce a beaded support under the foot, when the moulding ring 18 is lowered to the final position on the mould 2 and the quantity of glass inserted in the latter is pressed by the pressing cone 23 until the mould is entirely filled. The pressing cone 23 moves, as will be clarified hereinafter, entirely concentrically with the moulding ring 18 and the mould 2 along the axis 19.

The upper edge 24 of the mouth of the mould is slightly conically widened, so that, when the ring 18 is lowered, the protruding edge 20 of the moulding is guided to its accurately centered final position, whereupon the edge portion 20 enters the lower part 25 of the mouth of the mould so as to fit thereinto.

A recess 26 is defined by the upper part of the casing 15, the bore 14 in the guide block and the casing 16 and receives a piston ring 27 held by nuts 28 against a radial shoulder 29 on the casing 16.

When fluid under pressure is supplied through the connection 30 above the ring 27 the casing 16 together with the moulding ring 18 will be moved downwardly to its final position. During such downward movement, the fluid below the ring 27 escapes through an annular channel 31 and the connection 32. A pin 33 mounted on the arm 17 extends slidably into a bore 34 of the guide block 8 and prevents rotation of casing 16 in its guide, so that no lateral deviation of the moulding ring 18 can appear.

The return movement of the casing 16 is effected by supplying fluid under pressure through the connection 32.

The space 36 within the casing 16 is closed at the upper and lower ends, and within the upper end portion of space 36 there is disposed a piston 38 on the spindle 37 of the pressing cone. The downward movement of the pressing cone's spindle 37 is initiated by supplying fluid under pressure to space 36 above piston 38 by way of a channel 39 extending from a connection 40. At the end of the downward stroke, a downwardly protruding elongation 38' of the piston 38 with a sealing ring 40' penetrates into an annular slit 41 defined between the lower closure of the casing 36 and the spindle 37. At the beginning of the downward stroke the fluid below piston 38 can easily escape by way of the annular slit 41 and the annular channels 43, 43', the cross bores 44 in the casing 16, the annular channel 45 and the connection 46. After the elongation 38' of the piston has penetrated into the split 41, the fluid can only escape from the space 36 through the channel 47, the exit 48 of which is provided with an adjustable metering valve 49. In this way, the downward movement of the pressing cone is slowed as it enters the mould cavity, and due to the above arrangement the adjustment of this braking action can be effected at will. It further is possible to program the pressure operation so as to restrict to a certain maximum value the final pressure on the piston 38. It is further observed, that the channel 50, through which the pressure fluid is fed for lifting the spindle 37 of the pressing cone after the pressing stroke, is provided with a ball valve 51, so that during the downward stroke, the pressure fluid can only escape through the annular slit 41 and/or the channel 47.

A similar ball valve 52 is mounted in the feeding duct 39 for the pressure fluid above the piston 38. The escape of the pressure fluid during the upward stroke can therefore only take place by way of the channel 53, the passage of which is adjustable through a metering valve 54, so that in this case, too, the braking action can be regulated.

The spingle 37 of the pressing cone is hollow, so that through the connection 55 a cooling medium, in this case air from a blower, can be fed to the upper end thereof, the said air escaping through the channels 64 directed upwardly from the lower end of the pressing cone.

Through the connection 56 there can further be admitted a cooling medium to the space 57 between the cap 58 and the spindle 37 of the pressing cone. At the termination of the downward stroke of the spindle of the pressing cone the space 57 communicates with the spindle 37, so that, during pressing, additional cooling air is fed through the pressing cone 23.

Elastic sealing rings are applied in order to seal the various pressure spaces, as for instance is denoted by 59 for the piston 38.

What we claim is:
A device for moulding glass articles comprising
(A) a mould table supporting a pressing mould,
(B) a guide block mounted above said table and having means therein defining a vertical bore coaxial with said pressing mould and formed with a radially enlarged recess intermediate the ends of said bore,

(C) a hollow cylindrical casing slidable in said bore and bearing against, and being afforded stable support by the surface of the latter above and below said recess, said recess defining a first annular chamber around the casing,
  (1) said cylindrical casing an annular piston extending around, and fixed on the outer surface of said cylinder, said annular piston being disposed slidably in said first annular chamber, and
  (2) closure means at the upper and lower ends of said hollow casing,
(D) a moulding ring suspended coaxially from said casing for movement with the latter in directions toward and away from said pressing mould,
(E) a spindle extending coaxially through said hollow cylindrical casing and having slidable bearing support in said closure means at the upper and lower ends of the casing to define a second annular chamber within said casing which is radially separated from said first annular chamber by said casing,
  (1) said spindle carrying a pressing cone at its lower end coaxial with said pressing mould and moulding ring, and
  (2) a piston on said spindle slidable in said second annular chamber between said closure means at the upper and lower ends of the casing,
(F) said guide block having conduit means opening in said first annular chamber above and below said annular piston for alternately admitting and exhausting fluid under pressure to cause vertical displacement of said casing moving said moulding ring toward and away from said pressing mould, and
(G) said closure means at the upper and lower ends of the casing acting as bearings for said spindle having conduit means opening into said second annular chamber above and below said piston on the spindle for alternately admitting and exhausting fluid under pressure to cause displacement of said spindle relative to said casing moving said pressing cone through said moulding ring toward and away from said pressing mould.

References Cited by the Examiner
UNITED STATES PATENTS

| | | | |
|---|---|---|---|
| 877,981 | 2/08 | Beeson | 65—307 |
| 1,027,567 | 5/12 | Schies | 65—318 |
| 1,340,366 | 5/20 | Bingham | 65—318 |
| 1,942,832 | 1/34 | Piazzoli | 65—307 |
| 2,146,346 | 2/39 | Nelson | 65—314 |
| 2,225,899 | 12/40 | Benoit et al. | 65—159 |

DONALL H. SYLVESTER, *Primary Examiner.*